United States Patent
Oba et al.

(10) Patent No.: US 8,418,437 B2
(45) Date of Patent: Apr. 16, 2013

(54) JET FLOW DISCHARGE NOZZLE AND JET ENGINE

(75) Inventors: Yoshinori Oba, Tokorozawa (JP); Tsutomu Oishi, Hanno (JP)

(73) Assignee: IHI Corporation (JP)

( * ) Notice: Subject to any disclaimer, the term of this patent is extended or adjusted under 35 U.S.C. 154(b) by 893 days.

(21) Appl. No.: 12/519,558

(22) PCT Filed: Dec. 18, 2007

(86) PCT No.: PCT/JP2007/074295
§ 371 (c)(1),
(2), (4) Date: Jun. 17, 2009

(87) PCT Pub. No.: WO2008/075671
PCT Pub. Date: Jun. 26, 2008

(65) Prior Publication Data
US 2010/0031628 A1    Feb. 11, 2010

(30) Foreign Application Priority Data
Dec. 18, 2006    (JP) .................................. 2006-340066

(51) Int. Cl.
*F02K 1/40* (2006.01)
*F02K 1/46* (2006.01)
*F02K 3/04* (2006.01)

(52) U.S. Cl.
USPC ................. 60/264; 60/226.1; 60/770

(58) Field of Classification Search .................... 60/262, 60/264, 226.1, 770, 771; 239/265.19
See application file for complete search history.

(56) References Cited

U.S. PATENT DOCUMENTS

| 6,314,721 | B1 | 11/2001 | Mathews et al. ................. 60/264 |
| 6,360,528 | B1 * | 3/2002 | Brausch et al. .................. 60/264 |
| 6,532,729 | B2 | 3/2003 | Martens .......................... 60/204 |

(Continued)

FOREIGN PATENT DOCUMENTS

| CA | 2 592 676 | 2/2008 |
| JP | 4-325397 | 11/1992 |

(Continued)

OTHER PUBLICATIONS

B.A. Janardan et al., "AST Critical Propulsion and Noise Reduction Technologies for Future Commercial Subsonic Engines", NASA/CR-2000-210039, Dec. 2000, 300 pages.

(Continued)

*Primary Examiner* — Ted Kim
(74) *Attorney, Agent, or Firm* — Ostrolenk Faber LLP (57) ABSTRACT

A jet flow discharge nozzle includes a tubular partition wall, a tubular casing which covers an outer periphery of the tubular partition wall, and a bifurcation which extends in an axial direction of the tubular partition wall and the casing so as to support downstream ends of the tubular partition wall and the casing from outside. Inside of the tubular partition wall is defined as a flow path for a high-speed core flow. A space between the tubular partition wall and the casing is defined as a flow path for a low-speed bypass flow. A pair of first projections is provided at a downstream edge of the tubular partition wall near the bifurcation at positions symmetric about the bifurcation. One of ridges of each of the first projections faces an upstream side. The invention reduces noise by avoiding adverse effects of the presence of the bifurcation on an increase in noise.

9 Claims, 6 Drawing Sheets

U.S. PATENT DOCUMENTS

| | | | |
|---|---|---|---|
| 6,826,901 B2 | 12/2004 | Hebert | 60/204 |
| 7,520,124 B2 * | 4/2009 | Narayanan et al. | 60/770 |
| 8,157,207 B2 * | 4/2012 | Mengle et al. | 60/262 |
| 2005/0115245 A1 | 6/2005 | Prouteau et al. | 60/770 |
| 2006/0010853 A1 | 1/2006 | Goutines et al. | 60/262 |
| 2009/0071164 A1 * | 3/2009 | Renggli | 60/770 |

FOREIGN PATENT DOCUMENTS

| | | |
|---|---|---|
| JP | 2000-080958 | 3/2000 |
| JP | 2003-172205 | 6/2003 |
| JP | 2005-30404 | 2/2005 |
| JP | 2006-29328 | 2/2006 |

OTHER PUBLICATIONS

S.J. Massey et al. "Computational Analyses of Propulsion Aeroacoustics for Mixed Flow Nozzle Pylon installation at Takeoff", NASA/CR-2001-211056, Sep. 2001, 35 pages.

N.H. Saiyed et al., "Acoustics and Thrust of Separate-Flow Exhaust Nozzles with Mixing Devices for High-Bypass-Ratio Engines", NASA/TM-2000-209948, AIAA-2000-1961, Jun. 2000, 23 pages.

C.A. Hunter et al., "Computational Analysis of the Flow and Acoustic Effects of Jet-Pylon Interaction", AIAA 2005-3083, 11th AIAA/CEAS Aeroacoustics Conference May 23-25, 2005, Monterey, California, 16 pages.

R.H. Thomas et al., "Jet-Pylon Interaction of High Bypass Ratio Separate Flow Nozzle Configurations", AIAA-2004-2827, 16 pages.

V.G. Mengle et al,. "Reducing Propulsion Airframe Aeroacoustic interactions with Uniquely Tailored Chevrons: 1. Isolated Nozzles", AIAA-2006-2467, 18 pages.

V.G. Mengle et al., "Reducing Propulsion Airframe Aeroacoustic Interactions with Uniquely Tailored Chevrons: 2. Installed Nozzles", AIAA-2006-2434, 14 pages.

International Search Report and Written Opinion mailed Mar. 25, 2008 in corresponding PCT International Application No. PCT/JP2007/074295.

Office Action issued on counterpart Canadian Patent Application No. 2,673,001, dated Jan. 4, 2011.

* cited by examiner

JET FLOW DISCHARGE NOZZLE AND JET ENGINE

CROSS-REFERENCE TO RELATED APPLICATIONS

The present application is a 35 U.S.C. §§371 national phase conversion of PCT/JP2007/074295, filed Dec. 18, 2007, which claims priority of Japanese Patent Application No. 2006-340066, filed Dec. 18, 2006. The PCT International Application was published in the Japanese language.

BACKGROUND OF THE INVENTION

1. Field of the Invention

The present invention relates to a jet flow discharge nozzle and a jet engine.

2. Background Art

Airplane jet engines include a fan which takes air in, a compressor which acquires and compresses a part of the intake air, a combustion chamber which mixes fuel and the air compressed by the compressor and then burn the mixture, and a turbine which drives the fan and the compressor by combustion gas from the combustion chamber.

The compressor, the combustion chamber and the turbine are disposed inside a tubular partition wall. The fan is disposed at an upstream side in the tubular partition wall. The most part of the air taken in by the fan passes through a bypass path provided between the tubular partition wall and a casing which covers an outer periphery of the tubular partition wall. The air passing through the bypass path ("bypass flow") is discharged in a manner to surround air discharged from the turbine ("core flow"). The bypass flow and the core flow are then joined together.

A mixer that reduces jet noise by efficiently mixing the core flow and the bypass flow is disclosed in Patent Documents 1 to 3.

For example, the mixer disclosed in the Patent Document 1 includes a plurality of triangular pyramid-shaped bodies disposed at a downstream end of a tubular partition wall. The triangular pyramid-shaped bodies are disposed alternately on an outer peripheral surface and an inner peripheral surface of the tubular partition wall with a side of its bottom corresponding to the downstream end of the tubular partition wall.

Two side surfaces of each of the triangular pyramid-shaped bodies, which altogether form a ridge that faces an upstream side, guide a part of a high-speed inner flow (i.e., a core flow) and a low-speed outer flow (i.e., a bypass flow) in alternate directions. With this configuration, the air flows flowing inside and outside of the tubular partition wall are efficiently mixed together, which helps reduce jet noise.

Patent Document 1: Japanese Patent Application, First Publication No. 2003-172205

Patent Document 2: Japanese Patent Application, First Publication No. 2000-80958

Patent Document 3: U.S. Pat. No. 6,826,901

The core flow and the bypass flow joining together is a cause of jet engine noise. Another cause of jet engine noise is the presence of a bifurcation (also called pylon) provided for connecting a jet engine to an airplane body. The noise caused by the presence of the bifurcation will be described with reference to FIG. 8.

Figure 8:
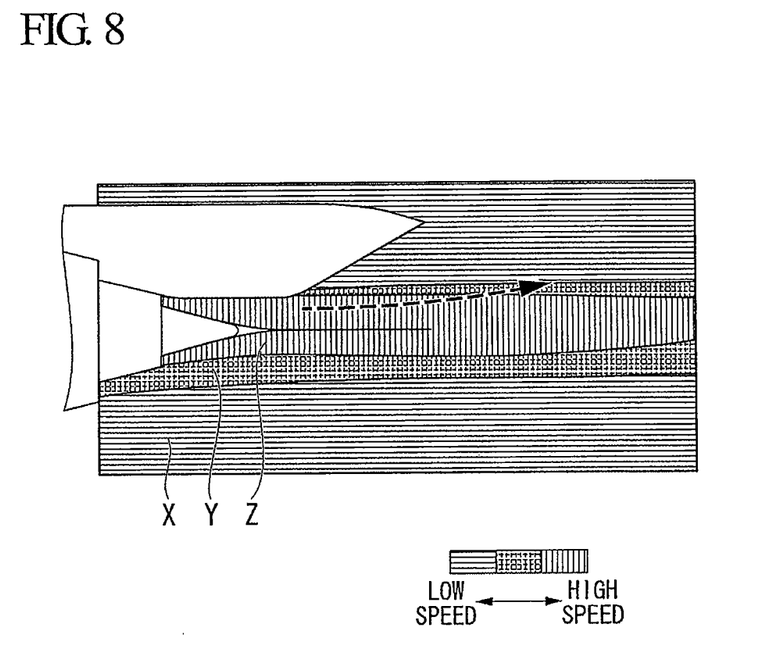
FIG. 8 is a schematic diagram showing a core flow, a bypass flow and an ambient air flow discharged from a related art jet engine.

In FIG. 8, Z represents a core flow, Y represents a bypass flow and X represents air flowing outside of the bypass flow (i.e., an ambient air flow). Regarding the flow speed, the core flow Z is high, the bypass flow Y is intermediate and the ambient air flow X is low.

As shown in FIG. 8, the bypass flow Y of intermediate flow speed exists between the core flow Z and the ambient air flow X at a position away from the bifurcation. The bypass flow Y becomes irregular at the downstream side near the bifurcation to let the core flow Z come close to the ambient air flow X.

When the core flow Z and the ambient air flow X come close to each other with significant speed difference therebetween, a speed change at an area where the flows are in contact with each other becomes rapid to undesirably increase noise.

SUMMARY OF THE INVENTION

The invention has been made in view of the aforementioned circumstances and an object thereof is to reduce noise by avoiding adverse effects of the presence of the bifurcation on an increase in noise.

To solve the aforementioned problem, a first aspect of the invention employs a jet flow discharge nozzle, which includes: a tubular partition wall; a tubular casing which covers an outer periphery of the tubular partition wall; and a bifurcation which extends in an axial direction of the tubular partition wall and the casing so as to support downstream ends of the tubular partition wall and the casing from outside, inside the tubular partition wall being defined as a flow path for a high-speed core flow and a space between the tubular partition wall and the casing being defined as a flow path for a low-speed bypass flow, wherein a pair of first projections is provided at a downstream edge of the tubular partition wall near the bifurcation at positions symmetric about the bifurcation, each of the first projections being inclined to make an acute angle with the axial direction from an upstream side toward a downstream side.

A second aspect of the invention employs a structure in which, in the jet flow discharge nozzle according to the first aspect, the first projections are provided inside secondary vortex generation areas located at both sides of the bifurcation.

A third aspect of the invention employs a structure in which, in the jet flow discharge nozzle according to the first or second aspect, the first projections protrude toward a peripheral direction inside of the tubular partition wall.

A fourth aspect of the invention employs a structure further including, in the jet flow discharge nozzle according to any one of the first to third aspects, a plurality of second projections disposed at intervals along a peripheral direction downstream edge of the tubular partition wall, each of the second projections being inclined to make an acute angle with the axial direction from an upstream side toward a downstream side and protruding toward peripheral direction inside and/or outside of the tubular partition wall.

A fifth aspect of the invention employs a structure in which, in the jet flow discharge nozzle according to any one of the first to fourth aspects, some of the second projections provided at a bifurcation side protrude toward the peripheral direction inside of the tubular partition wall.

A sixth aspect of the invention employs a structure in which, in the jet flow discharge nozzle according to any one of the first to fifth aspects, a number of the first and second projections which are located at a side of the bifurcation is greater than that of the first and second projections which are located at a side opposite to the bifurcation.

A seventh aspect of the invention employs a structure in which, in the jet flow discharge nozzle according to any one of the first to sixth aspects, the first projections are triangular pyramid-shaped bodies with one of their ridges facing the upstream side.

A eighth aspect of the invention employs a structure in which, in the jet flow discharge nozzle according to any one of the fourth to seventh aspects, the second projections are triangular pyramid-shaped bodies with one of their ridges facing the upstream side.

A ninth aspect of the invention employs a jet engine which includes: a fan which takes ambient air in; a compressor which compresses the intake ambient air; a combustion chamber which mixes fuel and the ambient air compressed by the compressor and then burns the mixture; and a turbine which drives the fan and the compressor by combustion gas from the combustion chamber, wherein the jet engine further includes the jet flow discharge nozzle according to any one of the first to eighth aspects, the bifurcation is provided to protrude downward from an airplane wing and the jet engine is suspended and supported by the bifurcation.

A tenth aspect of the invention employs a jet engine which includes: a fan which takes ambient air in; a compressor which compresses the intake ambient air; a combustion chamber which mixes fuel and the ambient air compressed by the compressor and then burns the mixture; and a turbine which drives the fan and the compressor by combustion gas from the combustion chamber, wherein the jet engine further includes the jet flow discharge nozzle according to any one of the first to eighth aspects, the bifurcation is provided to laterally protrude from an airplane body and the jet engine is cantilever-supported by the bifurcation.

According to the invention, a pair of first projections is provided near the bifurcation at positions symmetric about the bifurcation. The first projections guide the core flow near the bifurcation and efficiently mix the core flow with the bypass flow. Such a configuration reduces noise by avoiding adverse effects of the presence of the bifurcation on an increase in noise.

According to the second aspect of the invention, the first projections are provided inside secondary vortex generation areas located at both sides of the bifurcation. The first projections guide the core flow inside the secondary vortex generation areas where noise is often generated. Such a configuration reduces noise by avoiding adverse effects of the presence of the bifurcation on an increase in noise.

According to the third aspect of the invention, the first projections protrude toward a peripheral direction inside of the tubular partition wall. The first projections guide the core flow to move inward as it travels downstream, thereby preventing the core flow from coming close to the ambient air flow. Such a configuration reduces noise by avoiding adverse effects of the presence of the bifurcation on an increase in noise.

DESCRIPTION OF THE REFERENCE NUMERALS

100: jet engine, 1: nozzle (jet flow discharge nozzle), 2: fan, 3: compressor, 4: combustion chamber, 5: turbine, 11: casing, 12: tubular partition wall, 12a: downstream edge, 13: bifurcation, 14: air intake port, 15: bypass flow discharge port, 16: core flow discharge port, 21, 22: notches (first projections), 21a: ridge, 21b, 21c: air flow guide surfaces, 31, 32 and 33: notches (second projections), B: side of bifurcation, b: side opposite to bifurcation, A: air, X: ambient air flow, Y: bypass flow, Z: core flow, 200: jet engine, 41 to 45: notches, 300: jet engine

DESCRIPTION OF THE PREFERRED EMBODIMENTS

Figure 1:
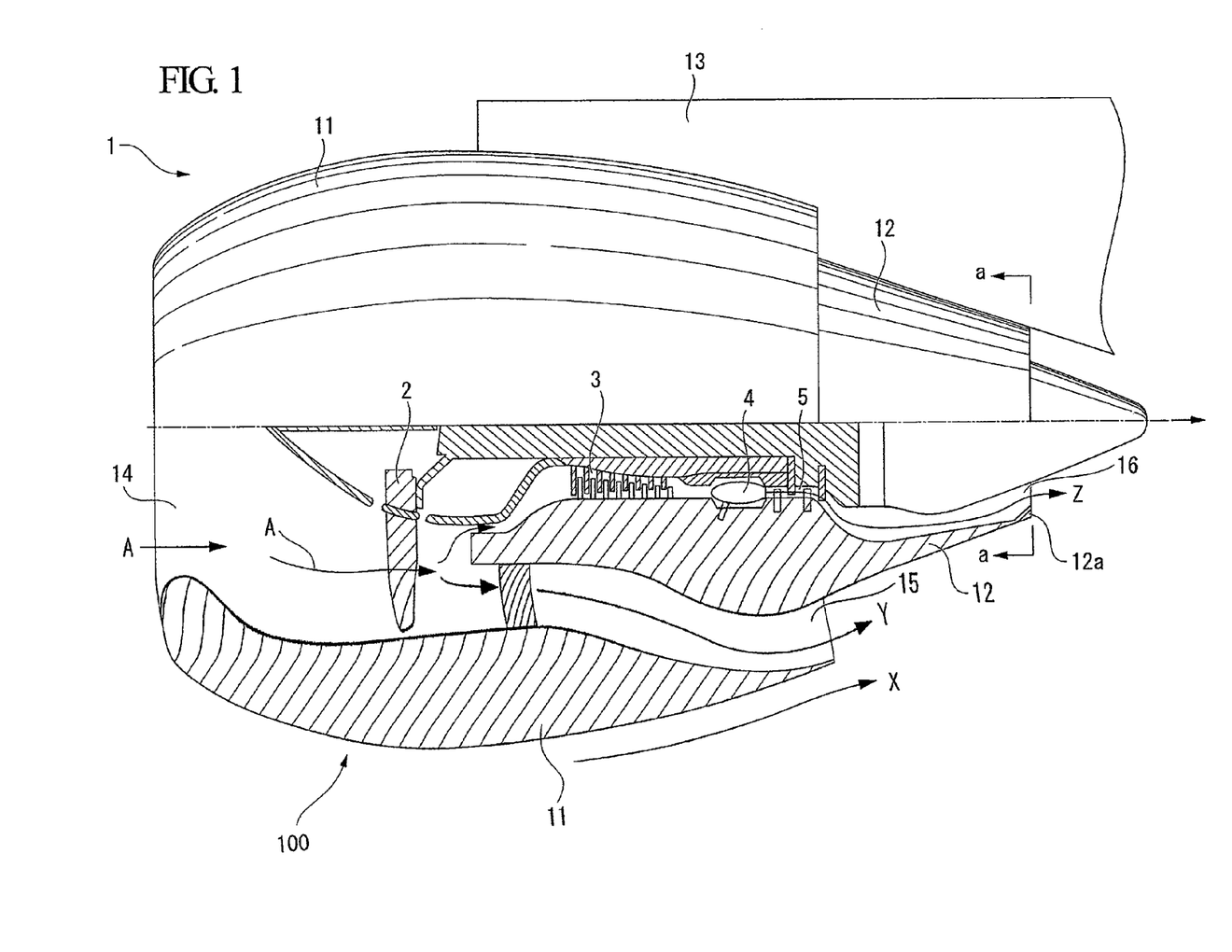
FIG. 1 is a cross-sectional view schematically showing a structure of a jet engine according to a first embodiment of the invention.

Referring now to the drawings, a first embodiment of the invention will be described. FIG. 1 is a cross-sectional view schematically showing a structure of a jet engine 100 according to a first embodiment of the invention.

The jet engine 100 includes a nozzle 1 (i.e., a jet flow discharge nozzle), a fan 2, a compressor 3, a combustion chamber 4 and a turbine 5.

The nozzle 1 includes a casing 11, a tubular partition wall 12 and a bifurcation 13.

The casing 11 and the tubular partition wall 12 are tubular members. The casing 11 defines an outline of the jet engine 100 and covers an outer periphery of the tubular partition wall 12.

The tubular partition wall 12 is disposed at a position slightly displaced further downstream with respect to the casing 11 along an axial direction of the casing 11. The tubular partition wall 12 separates a flow path of the core flow Z from a flow path of the bypass flow Y. The core flow Z is a high-speed air flow flowing inside the tubular partition wall 12 and the bypass flow Y is a low-speed air flow flowing between the tubular partition wall 12 and the casing 11.

The bifurcation 13 extends along the axial directions of the casing 11 and the tubular partition wall 12 so as to support downstream ends of the casing 11 and the tubular partition wall 12 from outside. The bifurcation 13 is provided to protrude downward from an airplane wing. The jet engine 100 is mounted on the airplane wing while being hung from and supported by the bifurcation 13.

The fan 2, the compressor 3, the combustion chamber 4 and the turbine 5 are sequentially arranged from the upstream side toward the downstream side in the nozzle 1.

The fan 2 is disposed near the upstream end of the casing 11 and in the upstream of the tubular partition wall 12 to take ambient air A in. The compressor 3 is disposed near the upstream end of the tubular partition wall 12 to acquire and compress a part of the ambient air A taken in by the fan 2.

The combustion chamber 4 is disposed at a downstream side of the compressor 3 in the tubular partition wall 12. The combustion chamber 4 mixes fuel with the ambient air A compressed by the compressor 3, burns the mixture and discharges combustion gas. The turbine 5 is disposed at the downstream side of the combustion chamber 4 in the tubular partition wall 12. The turbine 5 drives the fan 2 and the compressor 3 by the combustion gas discharged from the combustion chamber 4.

An upstream end opening of the casing 11 is an air intake port 14 for taking the ambient air A in.

A downstream end opening of the casing 11 is a bypass flow discharge port 15 for discharging the bypass flow Y. The bypass flow Y is a part of the ambient air A taken in from the air intake port 14 and is not acquired by the compressor 3.

A downstream end opening of the tubular partition wall 12 is a core flow discharge port 16 for discharging the core flow Z. The core flow Z is the air discharged from the turbine 5, namely combustion gas.

Reference numeral X represents an ambient air flow, which flows outside of the bypass flow Y and the casing 11.

Figure 2:
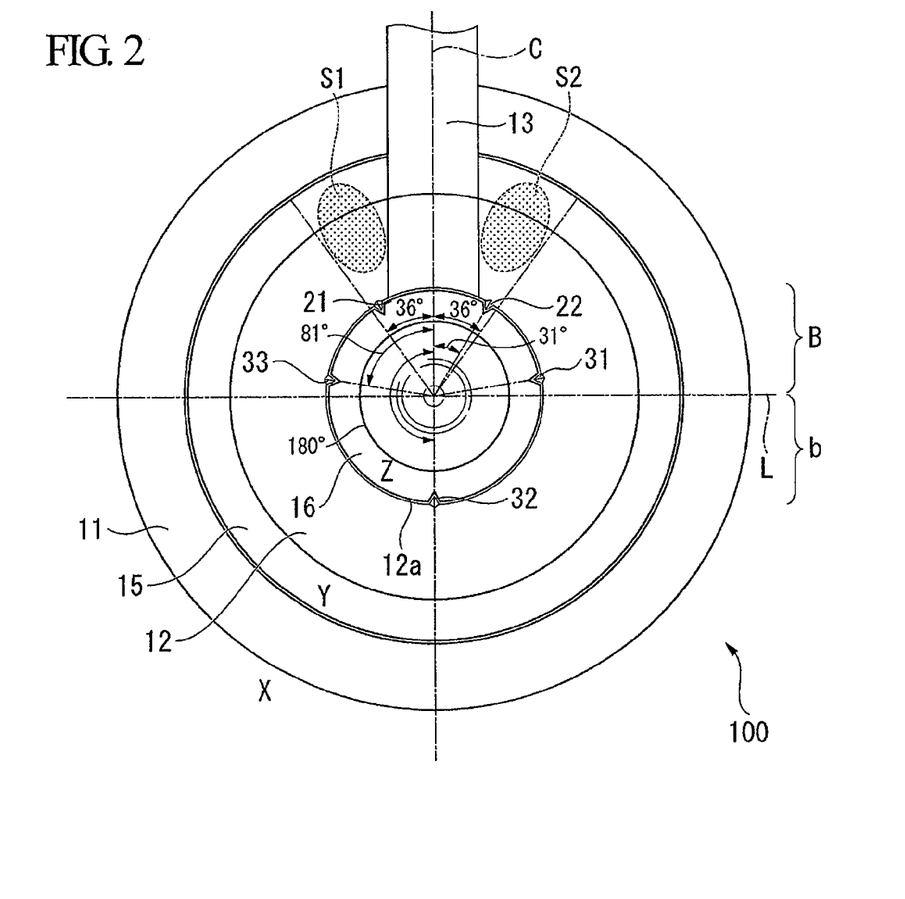
FIG. 2 is a cross-sectional view, taken along line a-a in FIG. 1, of the jet engine according to the first embodiment of the invention seen from a downstream side.

FIG. 2 is a cross-sectional view, taken along line a-a line in FIG. 1, of the jet engine 100 seen from the downstream side.

A secondary vortex (also called a horseshoe vortex) will be generated at both sides of the bifurcation 13. Areas S1 and S2 (i.e., secondary vortex generation areas) in which the secondary vortex will be generated are separately defined between a center line C of the bifurcation 13 and lines about 36 degrees from the center line C in both peripheral directions when the width of the bifurcation 13 is about 300 mm and the radius of the core flow discharge port 16 is about 300 mm.

The presence of the bifurcation 13 causes the secondary vortex, which may onset a disordered state of the bypass flow Y which normally surrounds the outer periphery of the core flow Z in the downstream of the bifurcation 13. As a result, the core flow Z comes close to the ambient air flow X flowing outside of the bypass flow Y to generate noise. In order to prevent this phenomenon, the present embodiment includes notches 21 and 22 (i.e., first projections, triangular pyramid-shaped bodies) at a downstream edge 12a of the tubular partition wall 12.

The notches 21 and 22 are arranged at positions symmetric about the bifurcation and inside the secondary vortex generation areas. Ridges of the notches 21 and 22 are displaced by about 31 degrees from the center line C of the bifurcation 13 in the peripheral direction of the bypass flow discharge port 15.

Notches 31, 32 and 33 (second projections, triangular pyramid-shaped bodies) are provided at the downstream edge 12a of the tubular partition wall 12.

The notches 31 and 32 are provided such that their ridges are displaced from the center line C by about 81 degrees in the peripheral direction of the bypass flow discharge port 15. In particular, if the downstream edge 12a of the tubular partition wall 12 is divided into a side B of the bifurcation and a side b opposite to the bifurcation by an imaginary line segment L that is perpendicular to the center line C of the bifurcation 13 and passing through the center of the tubular partition wall 12, the notches 31 and 32 are located at the side B of the bifurcation.

The notch 33 is provided such that its ridge is displaced from the center line C of the bifurcation 13 by about 180 degrees in the peripheral direction of the bypass flow discharge port 15. That is, the notch 33 is located at the side b opposite to the bifurcation.

As described above, the notches 31, 32 and 33 are provided such that a more number of notches are located at the side B of the bifurcation.

Figure 3:
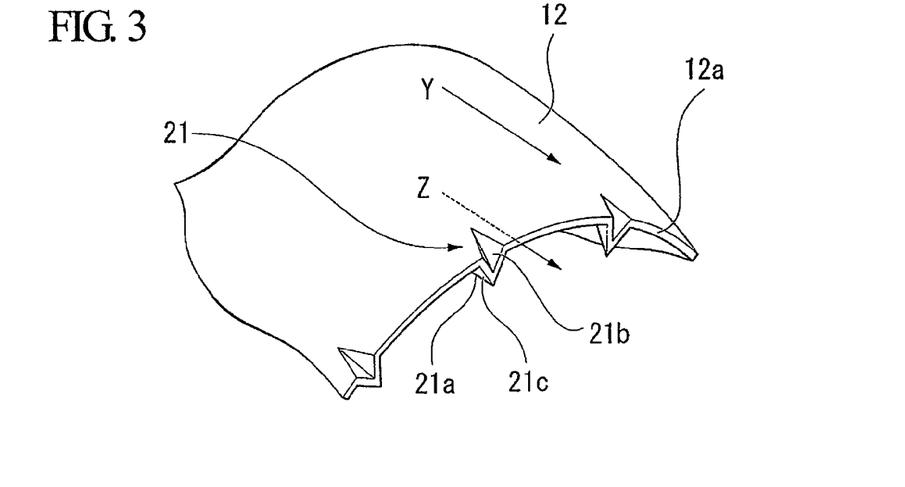
FIG. 3 is an outside perspective view of notches (i.e., first projections) according to the first embodiment of the invention.

As shown in the perspective view in FIG. 3, the notch 21 (22, 31, 32 and 33) includes air flow guide surfaces 21b and 21c defined as two side surfaces of a triangular pyramid-shaped body with its ridge 21a facing the upstream side. The air flow guide surfaces 21b and 21c are formed by folding the downstream edge 12a of the tubular partition wall 12 in a peripheral direction inside so as to protrude from the tubular partition wall 12.

The jet engine 100 configured as described above operates in a known manner. In particular, the fan 2 takes the ambient air A in through the air intake port 14, the compressor 3 compresses a part of the ambient air A taken in by the fan 2, the combustion chamber 4 mixes the fuel with the ambient air A compressed by the compressor 3 and burns the mixture, and the turbine 5 drives the fan 2 and the compressor 3 by the combustion gas discharged from the combustion chamber 4.

During the operation, the core flow Z flows inside the tubular partition wall 12 and the bypass flow Y flows between the tubular partition wall 12 and the casing 11. The core flow Z and the bypass flow Y are mixed together by the notches 21, 22, 31, 32 and 33.

The notch 21 (and 22) guides the core flow Z, which is discharged from the core flow discharge port 16, by the air flow guide surfaces 21b and 21c such that the core flow moves away from the secondary vortex generation areas S1 and S2 as it travels downstream. With this configuration, the core flow Z hardly comes close to the ambient air flow X, thereby reducing noise.

Figure 4:
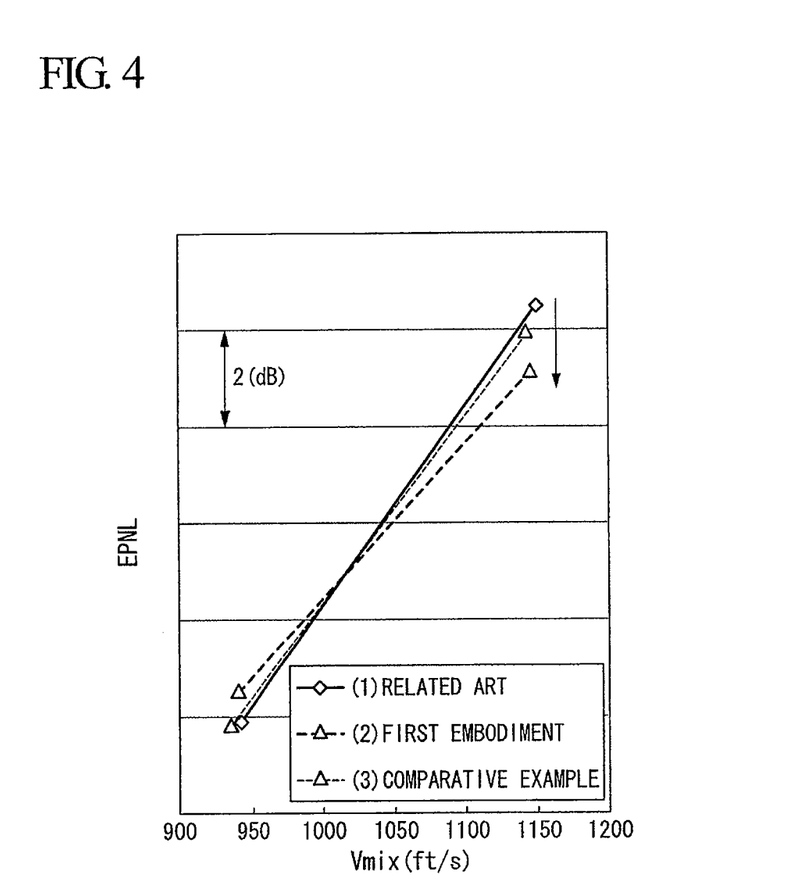
FIG. 4 is a graph which shows a relationship between speed and noise according to the first embodiment of the invention.
Figure 5:
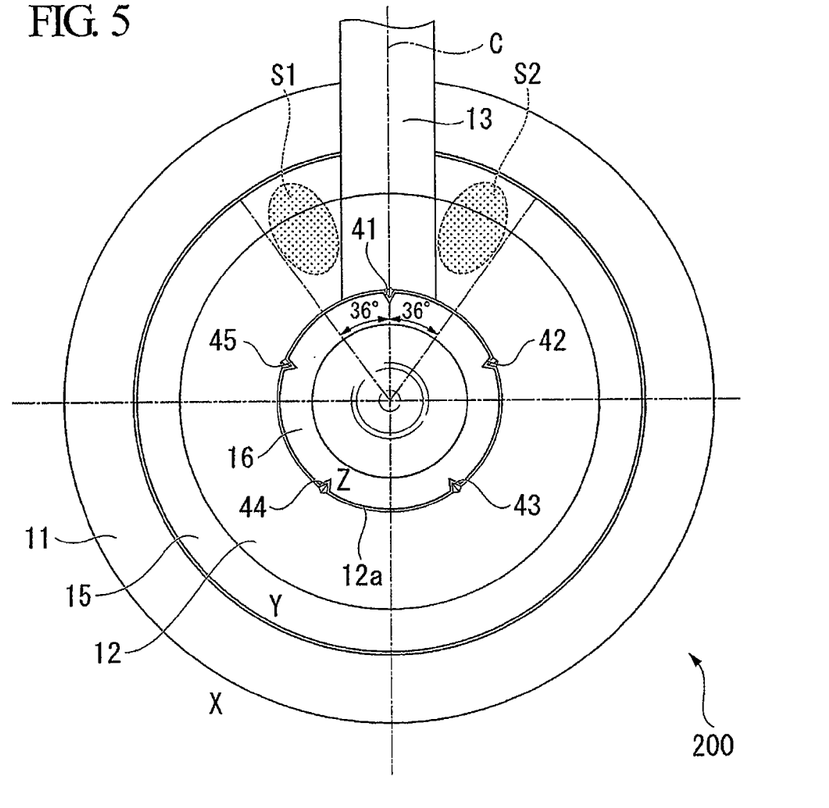
FIG. 5 is a cross-sectional view of a jet engine of Comparative Example of the first embodiment of the invention seen from a downstream side.

FIG. 4 is a graph which shows a relationship between speed and noise, and also shows a comparison between (1) noise of a related art jet engine, (2) noise of the jet engine 100 according to the present embodiment and (3) noise of the jet engine 200 of Comparative Example shown in FIG. 5.

Comparative Example of (3) shown in FIG. 5 includes notches 41 to 45 which are the same in number and configuration as those of the notches 21, 22, 31, 32 and 33 according to the present embodiment but different in location. The notch 41 is located to correspond to the center line C of the bifurcation 13 and other notches 42 to 45 are distributed in the peripheral direction at substantially regular intervals. Accordingly, none of the notches 41 to 45 exists inside the secondary vortex generation areas S1 and S2 in this example.

The graph in FIG. 4 shows that noise (2) of the present embodiment is reduced by up to about 2 dB as compared with noise (1) of the related art. Comparison of noise (3) of Comparative Example and noise (2) of the present embodiment shows that the notches 21, 22, 31, 32 and 33 according to the present embodiment have a greater noise reduction effect.

It is also shown that there is no significant difference between Comparative Example (3) and related art (1), both of them have a small noise reduction effect and even have increased noise at the low-speed areas.

As described above, according to the present embodiment, noise generated by the jet engine 100 is effectively reduced as compared with the related art by disposing the notches 21, 22, 31, 32 and 33 at suitable positions under consideration of influence of the bifurcation 13.

Figure 6:
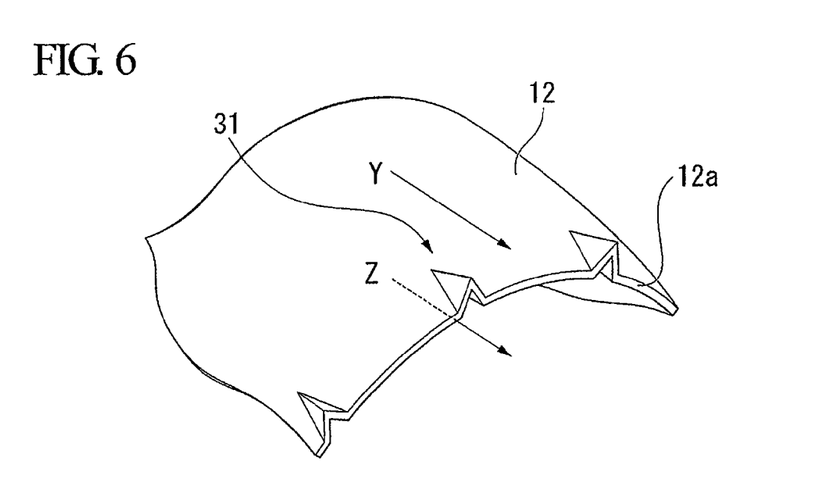
FIG. 6 is an outside perspective view of notches (i.e., second projections) according to a modified embodiment of the first embodiment of the invention.

In the above-described embodiment, the notch 21 (22, 31, 32 and 33) is formed by folding the downstream edge 12a of the tubular partition wall 12 in a peripheral direction inside as shown in FIG. 3. In practice, however, the notch 31 (21, 22, 32 and 33) may alternatively protrude in a peripheral direction outside as shown in FIG. 6.

Although five notches 21, 22, 31, 32 and 33 are provided in the above-described embodiment, a greater number of notches may be provided. In that case, the notches provided at the side opposite to the bifurcation may alternately protrude toward the peripheral direction inside and outside of the tubular partition wall. In this manner, the core flow Z and the bypass flow Y are mixed effectively.

Figure 7:
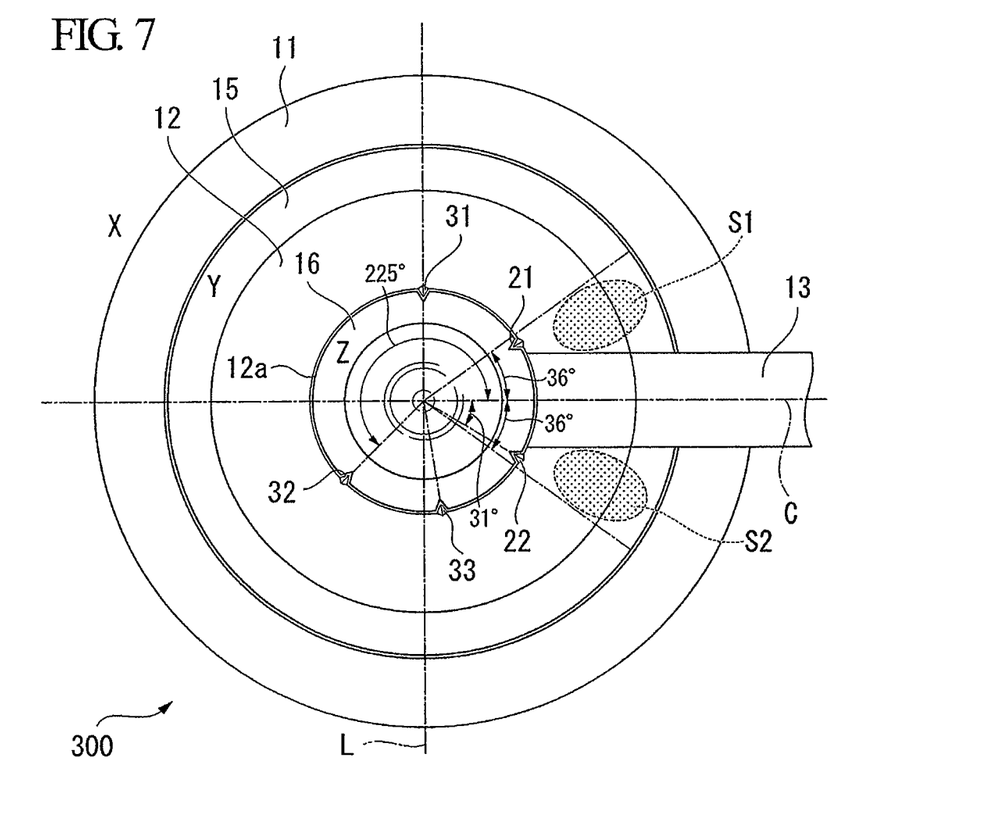
FIG. 7 is a cross-sectional view of a jet engine according to a second embodiment of the invention seen from a downstream side, corresponding to FIG. 2 according to the first embodiment.

Referring now to the drawings, a second embodiment of the invention will be described. FIG. 7 is a cross-sectional view of a jet engine 300 according to the present embodiment seen from a downstream side, corresponding to FIG. 2 according to the first embodiment. Components similar to those of the first embodiment will be denoted by similar reference numerals.

A bifurcation 13 of the jet engine 300 is provided to laterally protrude from an airplane body with its center line C being substantially horizontally oriented. Accordingly, the jet engine 300 is mounted on the airplane body while being cantilever-supported by the bifurcation 13.

As in the first embodiment, ridges of the notches 21 and 22 are displaced by about 31 degrees from the center line C of the bifurcation 13 in the peripheral direction of the bypass flow discharge port 15.

The notch 31 is provided such that its ridge is displaced by about 90 degrees from the center line C of the bifurcation 13 in the peripheral direction of the bypass flow discharge port 15. The notch 32 is provided such that its ridge is displaced by about 225 degrees from the center line C of the bifurcation 13 in the peripheral direction of the bypass flow discharge port 15. The notch 33 is provided at a substantially intermediate position between the notches 32 and 22.

In the present embodiment, by disposing the notches 21, 22, 31, 32 and 33 at the locations described above, a great number of notches are provided at a ground side of the jet engine 300 when the jet engine 300 is horizontally divided into two parts.

In the thus-configured jet engine 300, the notches 21 and 22 successfully reduce adverse effects of the presence of the bifurcation 13 on the noise. The noise toward the ground may also be reduced by efficiently mixing the core flow Z with the bypass flow Y at the ground side of the jet engine 300.

Although the first and second projections are described as the notches 21, 22, 31, 32 and 33 which are the triangular pyramid-shaped bodies in the above-described embodiments, the first and second projections are not limited to the same. In practice, the first and second projections may alternatively be of other configurations having a trapezoidal, rectangular, semicircular or other cross section as long as they have a flat or curved surface for guiding the airflow as described in the embodiment.

INDUSTRIAL APPLICABILITY

As described above, the invention reduces jet engine noise by avoiding adverse effects of the presence of the bifurcation on an increase in noise.

The invention claimed is:

1. A jet flow discharge nozzle, comprising:
a tubular partition wall;
a tubular casing which covers an outer periphery of the tubular partition wall;
a bifurcation which extends in an axial direction of the tubular partition wall and the casing so as to support downstream ends of the tubular partition wall and the casing from outside, inside the tubular partition wall being defined as a flow path for a high-speed core flow and a space between the tubular partition wall and the casing being defined as a flow path for a low-speed bypass flow;
a pair of first projections provided at a downstream edge of the tubular partition wall near the bifurcation at positions symmetric about the bifurcation, each of the first projections being inclined to make an acute angle with the axial direction from an upstream side toward a downstream side; and
a plurality of second projections disposed at intervals along a peripheral direction downstream edge of the tubular partition wall, each of the second projections being inclined to make an acute angle with the axial direction from the upstream side toward the downstream side and protruding toward peripheral direction inside and/or outside of the tubular partition wall,
wherein when the downstream edge of the tubular partition wall is divided into a side of the bifurcation and a side opposite to the bifurcation by an imaginary line segment which is perpendicular to a center line of the bifurcation and passing through the center of the tubular partition wall, a number of the first and second projections which are located at the side of the bifurcation are greater than a number of the first and second projections which are located at the side opposite to the bifurcation, and only one of the plurality of the second projections are located at the side opposite to the bifurcation.

2. A jet flow discharge nozzle according to claim 1, wherein the first projections are provided inside secondary vortex generation areas located at both sides of the bifurcation.

3. A jet flow discharge nozzle according to claim 1, wherein the first projections protrude toward a peripheral direction inside of the tubular partition wall.

4. A jet flow discharge nozzle according to claim 2,
wherein the pair of first projections consist of a first notch and a second notch, and the plurality of second projections are consisting of a third notch, a fourth notch, and a fifth notch, and
wherein the first and second notches are located inside the secondary vortex generation areas located at both sides of the bifurcation, the third and fourth notches are located at the side of the bifurcation, and the fifth notch is located at the side opposite to the bifurcation.

5. A jet flow discharge nozzle according to claim 2,
wherein the pair of first projections consist of a first notch and a second notch, and the plurality of second projections consist of a third notch, a fourth notch, and a fifth notch, and wherein the first and second notches each is displaced from the center line of the bifurcation by a first predetermined angle in the peripheral direction, the third notch is displaced from the center line of the bifurcation by a second predetermined angle in the peripheral direction, the fourth notch is displaced from the center line of the bifurcation by a third predetermined angle in the peripheral direction, the fifth notch is located at a substantially intermediate position between the second notch and the fourth notch, and
the third predetermined angle is greater than the second predetermined angle and the second predetermined angle is greater than the first predetermined angle.

6. A jet flow discharge nozzle according to claim 1, wherein the first projections are triangular pyramid-shaped bodies with one of their ridges facing the upstream side.

7. A jet flow discharge nozzle according to claim 1, wherein the second projections are triangular pyramid-shaped bodies with one of their ridges facing the upstream side.

8. A jet engine comprising: a fan which takes ambient air in; a compressor which compresses the intake ambient air; a combustion chamber which mixes fuel and the ambient air compressed by the compressor and then burn the mixture; and a turbine which drives the fan and the compressor by combustion gas from the combustion chamber, wherein the jet engine further includes the jet flow discharge nozzle according to claim 1, the bifurcation is provided to protrude downward from an airplane wing and the jet engine is suspended and supported by the bifurcation.

9. A jet engine comprising: a fan which takes ambient air in; a compressor which compresses the intake ambient air; a combustion chamber which mixes fuel and the ambient air compressed by the compressor and then burn the mixture; and a turbine which drives the fan and the compressor by combustion gas from the combustion chamber, wherein the jet engine further includes the jet flow discharge nozzle according to claim 1, the bifurcation is provided to laterally protrude from an airplane body and the jet engine is cantilever-supported by the bifurcation.

\* \* \* \* \*

UNITED STATES PATENT AND TRADEMARK OFFICE
CERTIFICATE OF CORRECTION

PATENT NO.       : 8,418,437 B2                                        Page 1 of 1
APPLICATION NO.  : 12/519558
DATED            : April 16, 2013
INVENTOR(S)      : Oba et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 908 days.

Signed and Sealed this
First Day of September, 2015

Michelle K. Lee
*Director of the United States Patent and Trademark Office*